(12) United States Patent
Metcalf et al.

(10) Patent No.: US 6,495,827 B2
(45) Date of Patent: Dec. 17, 2002

(54) HIGH-RESOLUTION STARING INFRARED SENSOR WITH HIGH DYNAMIC RANGE HAVING A LARGE FIELD OF REGARD

(75) Inventors: Travis W. Metcalf, El Cajon, CA (US); Charles S. Bendall, El Cajon, CA (US); Rockie L. Ricks, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 206 days.

(21) Appl. No.: 09/758,064

(22) Filed: Jan. 10, 2001

(65) Prior Publication Data

US 2002/0088942 A1 Jul. 11, 2002

(51) Int. Cl.[7] ............................................. H01L 31/09
(52) U.S. Cl. ........................ 250/330; 250/334; 250/347
(58) Field of Search ............................... 250/330, 332, 250/334, 347, 348, 353

(56) References Cited

U.S. PATENT DOCUMENTS 4,017,732 A * 4/1977 Runciman ................... 250/334
4,788,428 A * 11/1988 Metcalf et al. ............. 250/330
5,530,246 A * 6/1996 Hawkins ..................... 250/330

OTHER PUBLICATIONS

"Micromachined Adaptive Mirrors", Gleb Vdovin Dec. 12, 2000 pp. 1 thru 17 http://guernsey.et.tudelft.nl/tyson4/index.html.

* cited by examiner

Primary Examiner—Huy Mai
(74) Attorney, Agent, or Firm—James A. Ward; Michael A. Kagan; Peter A. Lipovsky

(57) ABSTRACT

A low-cost high-resolution staring infrared imaging sensor for viewing a large Field Of Regard (FOR) while integrating over a small IFOV to detect small dim targets by subdividing the FOR into a plurality of internal optical paths without the use of mechanically-movable parts. Each of the plurality of internal optical paths may be further subdivided by a plurality of steerable micro-mirrors to reduce the IFOV and enhance long-range target acquisition capability. The sensor includes a primary lens for accepting infrared radiation from a Field Of Regard (FOR), a plurality of primary mirrors each disposed to reflect a portion of an FOR image along a different optical path, a secondary lens in each optical path to focus the FOR image portion onto a secondary mirror for reflection along a preselected direction, and a tertiary lens in each optical path to focus the FOR image portion onto an image detector array.

12 Claims, 7 Drawing Sheets

HIGH-RESOLUTION STARING INFRARED SENSOR WITH HIGH DYNAMIC RANGE HAVING A LARGE FIELD OF REGARD

FEDERALLY-SPONSORED RESEARCH AND DEVELOPMENT

The present invention is assigned to the United States Government and is available for licencing for commercial purposes. Licensing and technical inquiries should be directed to the Office of Patent Counsel, Space and Naval Warfare Systems Center, San Diego, Code D0012, San Diego, Calif., 92152; telephone (619)553-3001, facsimile (619)553-3821.

BACKGROUND OF THE INVENTION

1. Field of the Invention

This invention relates generally to optical sensors and more particularly to a staring infrared sensor having a large Field Of Regard (FOR) while also having the small Instantaneous Field Of View (IFOV) needed for improved dynamic range at higher resolutions.

2. Description of the Prior Art

Infrared sensors with relatively large Fields Of Regard (FORs) are needed for viewing a large portion of the horizon. Such sensors that also have a relatively small Instantaneous Field Of View (IFOV) are generally classified as Infrared Search and Track (IRST) sensors. With appropriate signal processing, these IRST sensors can detect and track targets at ranges otherwise too large to permit resolution of the target. The target detection range is highly dependent on the signal to noise ratio at the IRST sensor, which depends on the available IFOV and integration time as well as other factors. IRST sensors are known in the art to include the scanning sensor, the step-stare sensor and the staring sensor.

The scanning sensor has a small IFOV that is mechanically scanned through the desired Field Of Regard (FOR). A well-known disadvantage of the scanning sensor is the requirement for a large, heavy and expensive electromechanical scanning apparatus. Another well-known disadvantage is the necessarily short sensor integration time, which reduces the sensitivity of the sensor.

The step-stare sensor has a small IFOV that is mechanically scanned through the desired FOR, but uses a mirror that rotates in the opposite direction in steps to momentarily keep the image stationary. This effectively increases the available integration time. A well-known disadvantage of the step-stare sensor is the complexity and cost of the requisite mechanically-scanned mirror.

The staring infrared sensor has a relatively small FOR because of the narrow FOV lens needed to keep the IFOV to an acceptably small value. A well-known disadvantage of the staring sensor is the number of individual sensors required to cover the desired FOR. The disadvantage of using an array of many staring sensors is the increased weight, volume and cost.

In view of these deficiencies, there is accordingly a well-known need for an inexpensive infrared sensor that provides a large Field Of Regard (FOR) and a small IFOV for long-range surveillance applications. These unresolved problems and deficiencies are clearly felt in the art and are solved by this invention in the manner described below.

SUMMARY OF THE INVENTION

This invention solves the problem of viewing a large Field Of Regard (FOR) while also integrating over a small IFOV by subdividing the FOR into a plurality of internal optical paths without the use of mechanically-movable parts.

It is a purpose of this invention to provide a low cost staring infrared imaging sensor capable of viewing a large portion of the horizon, and detecting small dim targets at long standoff ranges. It is a feature of this invention that each of the plurality of internal optical paths may be further subdivided by a plurality of steerable micro-mirrors to further reduce the IFOV of the invention.

In one aspect, the invention is a staring infrared imaging sensor including a primary lens disposed to accept infrared radiation and to project therefrom a Field Of Regard (FOR) image onto a primary image plane, a plurality of primary mirrors disposed at the primary image plane each for reflecting a corresponding portion of the FOR image along a corresponding one of a plurality of optical paths, a secondary lens disposed within each optical path to focus the corresponding FOR image portion onto a corresponding secondary image plane within the corresponding optical path, a secondary mirror disposed at the corresponding secondary image plane within each optical path to reflect the corresponding FOR image portion along one of a corresponding plurality of preselected directions, an image detector disposed at a tertiary image plane for generating an electronic signal representing an image projected onto the tertiary image plane, and a tertiary lens disposed within each optical path to focus the corresponding FOR image portion onto the tertiary image plane.

In a preferred embodiment, each secondary mirror includes a plurality of micro-mirrors each movable from one to another of a plurality of positions, whereby an instantaneous field of view (IFOV) image within the corresponding FOR image portion can be redirected from one to another of the preselected directions.

In another aspect, the invention is an infrared detection system including a staring infrared imaging sensor having a primary lens disposed to accept infrared radiation and to project therefrom a Field Of Regard (FOR) image onto a primary image plane, a plurality of primary mirrors disposed at the primary image plane each for reflecting a corresponding portion of the FOR image along a corresponding one of a plurality of optical paths, a secondary lens disposed within each optical path to focus the corresponding FOR image portion onto a corresponding secondary image plane within the corresponding optical path, a secondary mirror disposed at the corresponding secondary image plane within each optical path to reflect the corresponding FOR image portion along one of a corresponding plurality of preselected directions, an image detector disposed at a tertiary image plane for generating an electronic signal representing an image projected onto the tertiary image plane, and a tertiary lens disposed within each optical path to focus the corresponding FOR image portion onto the tertiary image plane, and a controller coupled to the secondary mirrors for apportioning the amount of time during which the corresponding FOR image portion is directed along any one of the corresponding plurality of preselected directions.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

DESCRIPTION OF THE PREFERRED EMBODIMENT

Figure 1:
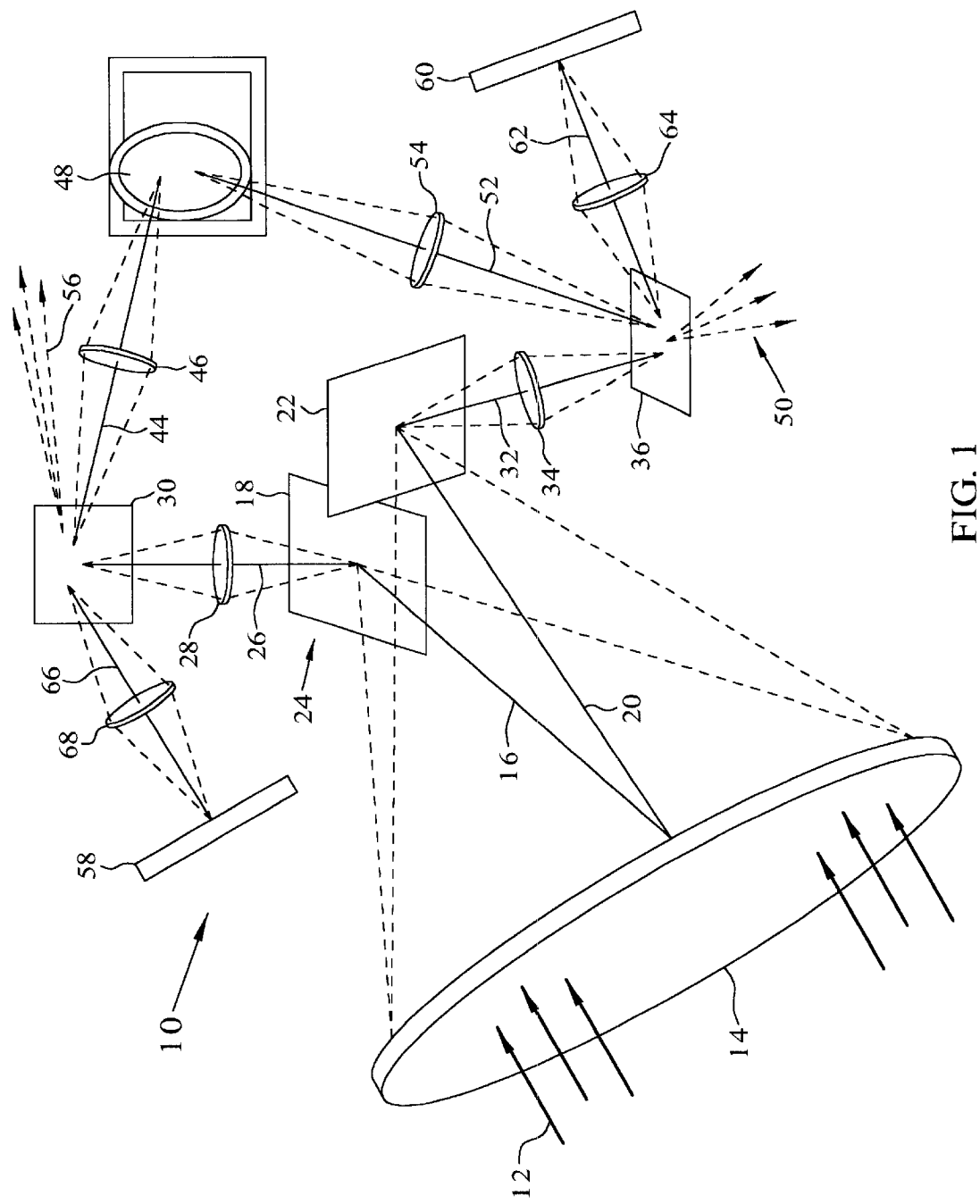
FIG. 1 illustrates a schematic representation of the operation of an exemplary embodiment of the staring infrared imaging sensor of this invention.

FIG. 1 illustrates a schematic representation of an exemplary embodiment of the staring infrared (IR) imaging sensor 10 of this invention. Sensor 10 provides a larger field or regard (FOR) and smaller instantaneous field of view (IFOV) than is available from sensors known in the art that do not mechanically move a sensor head or reverse step-scan a mirror. In operation, the infrared radiation 12 arrives from the distant FOR (not shown) at the primary lens 14. Part of the FOR image captured by primary lens 14 is directed along the first optical path 16 to a primary image plane at the first primary mirror 18. Similarly, an adjacent part of the FOR image is directed along a second optical path 20 to the primary image plane at the second primary mirror 22. First and second primary mirrors 18, 22 are moveably disposed against one another to form a primary mirror assembly 24 of abutted folding mirrors exemplified by primary mirrors 18, 22. The FOV of primary lens 14 has a diameter large enough to project an FOR image on the primary image plane subtending primary mirror assembly 24. The precise number of primary mirrors in array 24 and the diameter of the image plane depends on the FOR desired for sensor 10.

At primary mirror 18, a first sub-area of the FOR is reflected from the primary image plane along the optical path 26 to a secondary lens 28, which refocuses the corresponding portion of the FOR image at a secondary image plane occupied by the secondary mirror 30. Similarly, another sub-area of the FOR is reflected from the primary image plane along the optical path 32 to a corresponding secondary lens 34 that refocuses the corresponding portion of the FOR image at another secondary image plane occupied by the secondary mirror 36.

Secondary mirrors 30 and 36 are each preferably embodied as a relatively inexpensive micro-machined mirror array such as the Digital Micro-mirror Device™ (DMD™ made and sold by Texas Instruments Incorporated. The DMD™ is a reflective array of fast, digital light switches that are monolithically integrated onto a silicon address chip for digital image display system applications. For instance, Texas Instruments Incorporated also make and sell the Digital Light Processing™ (DLP™) projection display systems based on their DMD™, which is adapted to provide high-quality, seamless, all-digital images with exceptional stability and minimal image lag. Digital projection display systems based on the DMD™ use its silicon addressing circuitry and monolithic aluminum mirrors to achieve unique addressing modes, bit resolutions, pixel resolutions, aperture ratios, and color spaces in both three-chip and single-chip configurations. Until now, however, there is no teaching nor suggestion in the art for any use of the DMD™ in infrared sensor applications. One version of the DMD™ is known for use in projector systems and large screen displays available from several vendors. In these devices lamps are used to illuminate the micro-mirror arrays, which reflect the light through a projection lens. Other useful micro-mirror devices are described by practitioners in the art. For instance, Gleb Vdovin describes the micro-mirror art in "Micromachined Adaptive Mirrors," Laboratory of Electronic Instrumentation, Delft University of Technology, P.O. Box 5031, 2600 GA, Delft, The Netherlands, Phone: 31-15-2785756, Fax: 31-15-2785755, email: gleb@ei.et.tudelft.nl.

Figure 2:
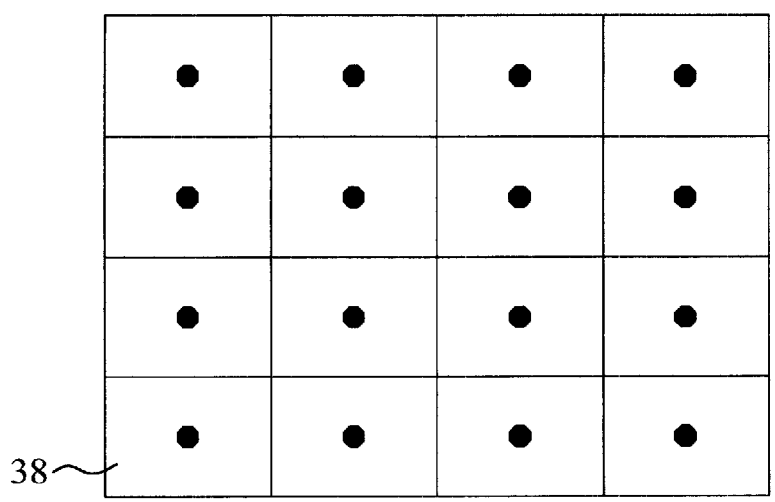
FIG. 2 shows a facial view of an exemplary section of a micro-mirror array suitable for use with the staring infrared imaging sensor of this invention.

FIG. 2 shows a facial view of an exemplary section of a micro-mirror array suitable for the secondary mirrors 30 and 36, which each include hundreds of thousands of individual micro-mirrors exemplified by the single micro-mirror 38. For example, secondary mirror 30 or 36 (FIG. 1) may include 1.3 million individual micro-mirrors exemplified by micro-mirror 38 (FIG. 2), each measuring 16 by 16 microns, arranged in a 1280 by 1024 array, suitable for mapping the 1.3 million pixels defining an SVGA digital image. Each micro-mirror in such an array acts as a reflective digital light switch that precisely controls the light intensity for one pixel of a projected image.

Figure 3A:
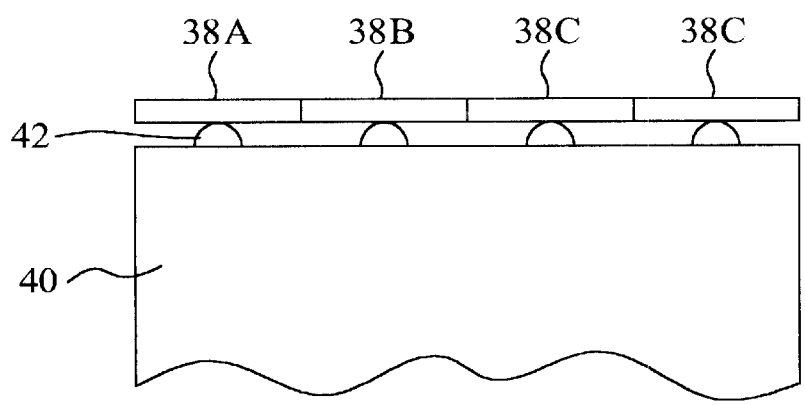
FIGS. 3A–3B show exemplary dispositions of the micromirror array of FIG. 2 from the side.
Figure 3B:
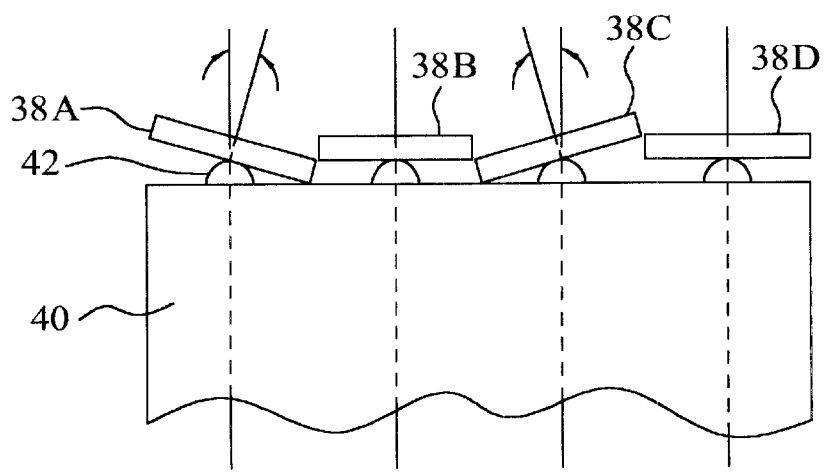

As shown in FIGS. 3A–3B, each individual micro-mirror 38 is attached to the substrate 40 by a hinge 42 that allows each micro-mirror 38 to tilt independently in one of two directions by a predetermined angle; for example, precisely +10 degrees. The predetermined angles are established by mechanical stops (not shown) disposed between substrate 40 and micro-mirror 38. In this description, one of the angles (e.g. +10 degrees, shown for micro-mirror 38A) is arbitrarily designated as "on" and the other (e.g. −10 degrees, shown for micro-mirror 38C) is arbitrarily designated as "off." The relaxed angle (e.g., zero degrees, shown for micro-mirrors 38B and 38D) is not normally used because of the imprecision in position arising from absence of a predetermined mechanical stop. As used in the digital video projection arts, the intensity of each pixel is adjusted by using a suitable pulse-width modulated signal to flip the corresponding micro-mirror on and off so rapidly that the flicker is invisible to the human eye. The average illumination reflected by the corresponding micro-mirror then determines the visual intensity of the pixel, which can be adjusted by changing the duty-cycle of the pulse-width modulated control signal.

Returning to FIG. 1, the use in accordance with this invention of a plurality of micro-mirror arrays, disposed as secondary mirrors 30 and 36, to sequentially sample sub areas of the image plane is now described. In FIG. 1, the two exemplary optical channels (one comprising paths 16 & 26 and the other comprising paths 20 & 32) operate to effectively double the FOV of staring IR imaging sensor 10. Following the teachings set forth herein, more optical channels may be added to further enhance sensor FOV, limited only by the size of the primary image plane and FOV of the input lens. When the micro-mirrors in secondary mirror 30 are tilted "on," and the micro-mirrors in secondary mirror 36 are tilted "off," the first optical channel comprising paths 16 & 26 is active and the image in the first sub-area of the FOR is reflected along the optical path 44 and focused by the tertiary lens 46 onto the IR detector array 48 disposed in a tertiary image plane. These positions are maintained for a predetermined integration time to allow the accumulation of each of the electronic pixel signals (not shown) produced by detector array 48 responsive to the pixel intensities of the first sub-area image projected onto the tertiary image plane. During this integration time, the second FOV sub-area is reflected by the micro-mirrors in secondary mirror 36 along the optical path 50 onto the housing wall (not shown). During the next integration time period, the micro-mirrors in secondary mirror 30 are tilted "off" and the micro-mirrors in secondary mirror 36 are tilted "on." The second optical channel comprising paths 20 & 32 is active and the image in the second sub-area of the FOR is reflected along the optical path 52 and focused by the tertiary lens 54 onto the IR detector array 48 disposed in the tertiary image plane. These positions are maintained for a predetermined integration time to allow the accumulation of each of the electronic pixel signals (not shown) produced by detector array 48 responsive to the pixel intensities of the second sub-area image projected onto the tertiary image plane. During this integration time, the first FOV sub-area is reflected by the micro-mirrors in secondary mirror 30 along the optical path 56 onto the housing wall (not shown).

Since the several optical paths for each FOV sub-area image are slightly off of the detector axis, the cold shield aperture must be opened to avoid blocking some of the incoming IR radiation. The thermoelectric (TE) cooler surfaces 58 and 60 and the associated optics operate to prevent detector array 48 from measuring heat from the warm housing. TE cooler surface 60 is disposed for imaging onto detector array 48 through the inactive channel along the optical path 62 through the quaternary lens 64 onto the tilted-off micro-mirrors in secondary mirror 36 and along optical path 52 when the first sub-area image is directed onto detector array 48 through the active first channel. Thus, while the first channel is active, the only photons impinging onto detector array 48 are the photons from the first sub-area image of the scene and the photons from TE cooler surface 60. Similarly, TE cooler surface 58 is disposed for imaging onto detector array 48 through the inactive channel along the optical path 66 through the quaternary lens 68 onto the tilted-off micro-mirrors in secondary mirror 30 and along optical path 44 when the second sub-area image is directed onto detector array 48 through the active second channel. Thus, while the second channel is active, the only photons impinging onto detector array 48 are the photons from the second sub-area image of the scene and the photons from TE cooler 58.

TE cooler surfaces 58 and 60 are required to prevent detector array 48 from seeing the warm walls of the housing. If TE cooler surfaces 58 and 60 are cooled much cooler than the FOR scene background, the contribution of TE cooler surface noise photons should be negligible. Other benefits of the TE coolers are discussed herein below. In operation, the positions of all micro-mirrors in the secondary mirror arrays are changed in azimuth by ±10 degrees. Secondary mirrors 30 and 36 are disposed such that when the individual micro-mirrors of secondary mirror array 30 are flipped to one side, to +10 degrees for example, the sub-area image is deflected off of secondary mirror 30 and re-imaged onto detector array 48. At the same time, the individual micro-mirrors in secondary mirror 36 are flipped to the other side, at −10 degrees, and therefore direct the other sub-area image away from detector array 48 while directing an image of TE cooler surface 60 onto detector array 48. After holding these positions for the desired integration time, the micro-mirrors in both secondary mirrors 30 and 36 are flipped to opposite sides so the sub-area image from the first optical channel now misses detector array 48 and the sub-area image from secondary mirror 36 is now directed onto detector array 48 along with the image of TE cooler surface 58. Simple signal processing is required to reassemble the sequential electronic image pixel signals into a single seamless wide-FOV image.

Except for oscillation of the individual micro-mirrors exemplified by micro-mirror 38 in FIG. 2, there are no moving parts in the staring IR imaging sensor of this invention. The increase in FOR is achieved over the prior art without panning or adding other sensors. In operation, the FOR image area is effectively broken up into a plurality of IFOV image sub-areas that are sequentially transmitted from lens 14 onto a single detector array 48 (FIG. 1). Generally, given an IFOV image sub-area specification, the monitored FOR image area can be expanded by a factor equal to the number of available optical channels exemplified by the two optical channels discussed above with reference to FIG. 1. For the staring IR sensor of the prior art having a 1280 by 1024 pixel detector array and a 200 micro-radian IFOV requirement, the monitored FOR in azimuth is about 15 degrees. Four of these prior art staring sensors are required to monitor a 60 degree FOR. Using the same 1280 by 1024 pixel detector array and 200 micro-radian IFOV requirement, the same 60-degree field of regard can be monitored using the same detector array in a single staring IR sensor of this invention with four optical channels disposed similarly to the two optical channels illustrated in FIG. 1.

Using an alternative embodiment of this invention, the FOR may be doubled again with no additional optical channels. Although the 1280 by 1024 micro-mirror array is currently preferred, a staring IR sensor of this invention employing a larger array of 1000 by 2000 micro-mirrors for the secondary mirrors 30 and 36 (FIG. 1) permits a doubling of the monitored FOR for the same IFOV image sub-area requirement. The micro-mirror array area is subdivided into two sub-areas within one of which the micro-mirrors tilted to one position, +10 degrees for example, while all the micro-mirrors within the other are tilted to the other position, −10 degrees. Only that portion of the secondary image plane subtended by the +10 degree micro-mirrors is directed through the tertiary lens onto the detector array. After an integration time, the two sub-areas of the secondary mirror are tilted to opposite positions. In this manner, a secondary mirror array with 2000 micro-mirrors in azimuth monitors twice the azimuth of a secondary mirror array with 1000 mirrors in azimuth.

Figure 4:
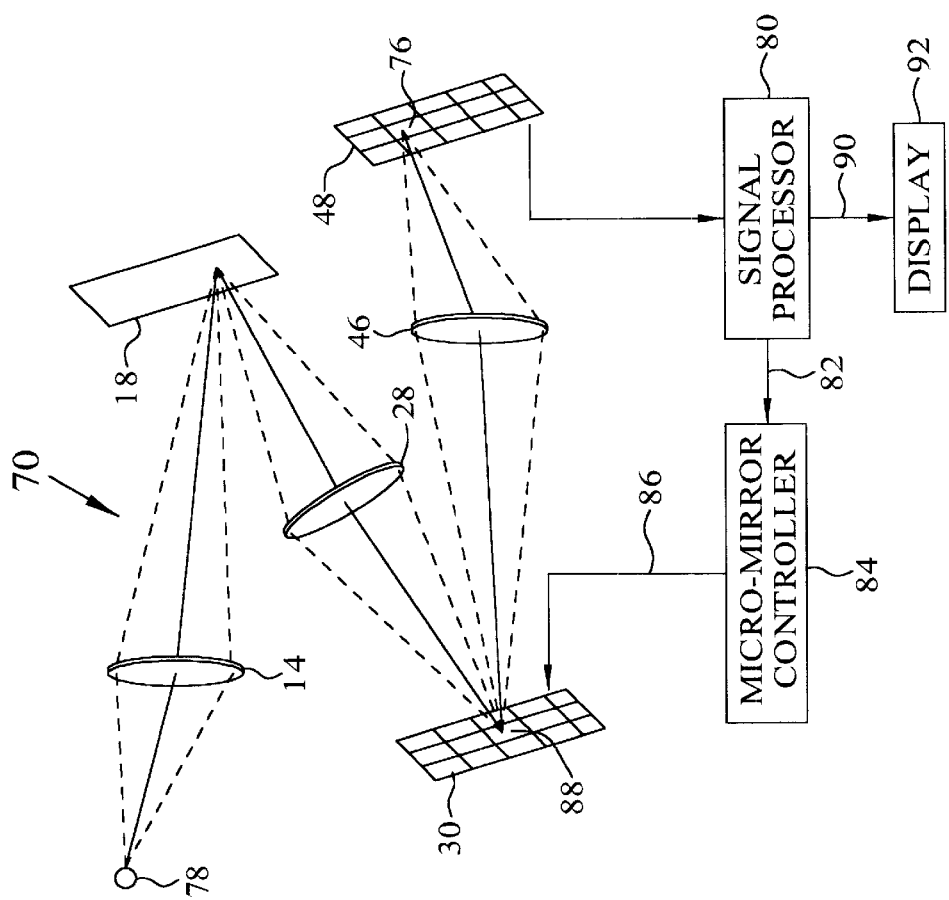
FIG. 4 illustrates a block diagram of an illustrative embodiment of the staring infrared imaging sensor of this invention.

As used in the image projection arts, the individual pixel micro-mirrors flip back and forth according to a pulse-width modulated control signal of as much as 1000 Hz to vary the average illumination projected for any particular pixel. In accordance with the operation of the staring IR imaging sensor described above, the individual micro-mirrors are held stationary during a detection integration time period. In a useful alternative embodiment of this invention, selected micro-mirrors in the secondary mirror array are caused to oscillate during the integration interval. For expository simplicity, FIG. 4 illustrates this concept for a single pixel transmitted through the active image channel 70 comprising detector array 48 and secondary micro-mirror array 30 (FIG. 1). When a single pixel detector 76 in detector array 48 approaches a saturation condition caused by the IR level arriving from a hot spot 78 in FOR image 12 (FIG. 1), the signal processor 80 sends a signal 82 to the micro-mirror controller 84 responsive to the impending saturation condition of pixel detector 76. Controller 80 responsively sends a signal 86 to secondary micro-mirror array 30 that causes the corresponding micro-mirror element 88 to oscillate at a predetermined duty cycle selected to reduce the effective integration time for pixel detector 76, thereby prevent pixel detector 76 from saturating. The actual output of pixel detector 76 is re-scaled in signal processor 80 by the predetermined duty cycle to recover the actual IR pixel intensity value for hot spot 78 before sending an output signal 90 to a display device 92.

In the above description, only the two extreme micro-mirror tilt angles (e.g., +10°) are considered because nothing more is needed for single band imaging. When one of the micro-mirror arrays is tilted to +10 degrees to reflect an image sub-area onto detector array 48, all other micro-mirror arrays are tilted to the −10 degree position. But a third micro-mirror position is useful for dual-band imaging. This third "zero-bias" position is available from the micro-mirror array by removing the tilt bias voltage, which allows the micro-mirror to relax to a default position roughly midway between the positive and negative extremes. The uniformity of this "zero-bias" position over the micro-mirror array is insufficient for imaging but is still useful for dual-band applications because the image sub-area reflected by the "zero-biased" micro-mirrors need not be imaged. Dual-band imaging can be achieved by adding a second detector array 94 (for detecting an image in a second optical band) to staring infrared (IR) imaging sensor 10 from FIG. 1, as shown in FIGS. 5A–5D. The photons that are otherwise deflected by "off-tilted" micro-mirrors in secondary mirror arrays 36 and 30 (FIG. 1) into the surrounding housing along optical paths 50 and 56 are now deflected and imaged onto second detector array 94. As discussed above with reference to FIG. 1, photons are deflected by "on-tilted" micro-mirrors in secondary mirrors 36 and 30 are deflected along optical paths 52 and 46 and imaged onto detector array 48, which is used for detecting an image in a first IR band. The spectral band of the second detector array can be either visible or IR.

Figure 5A:
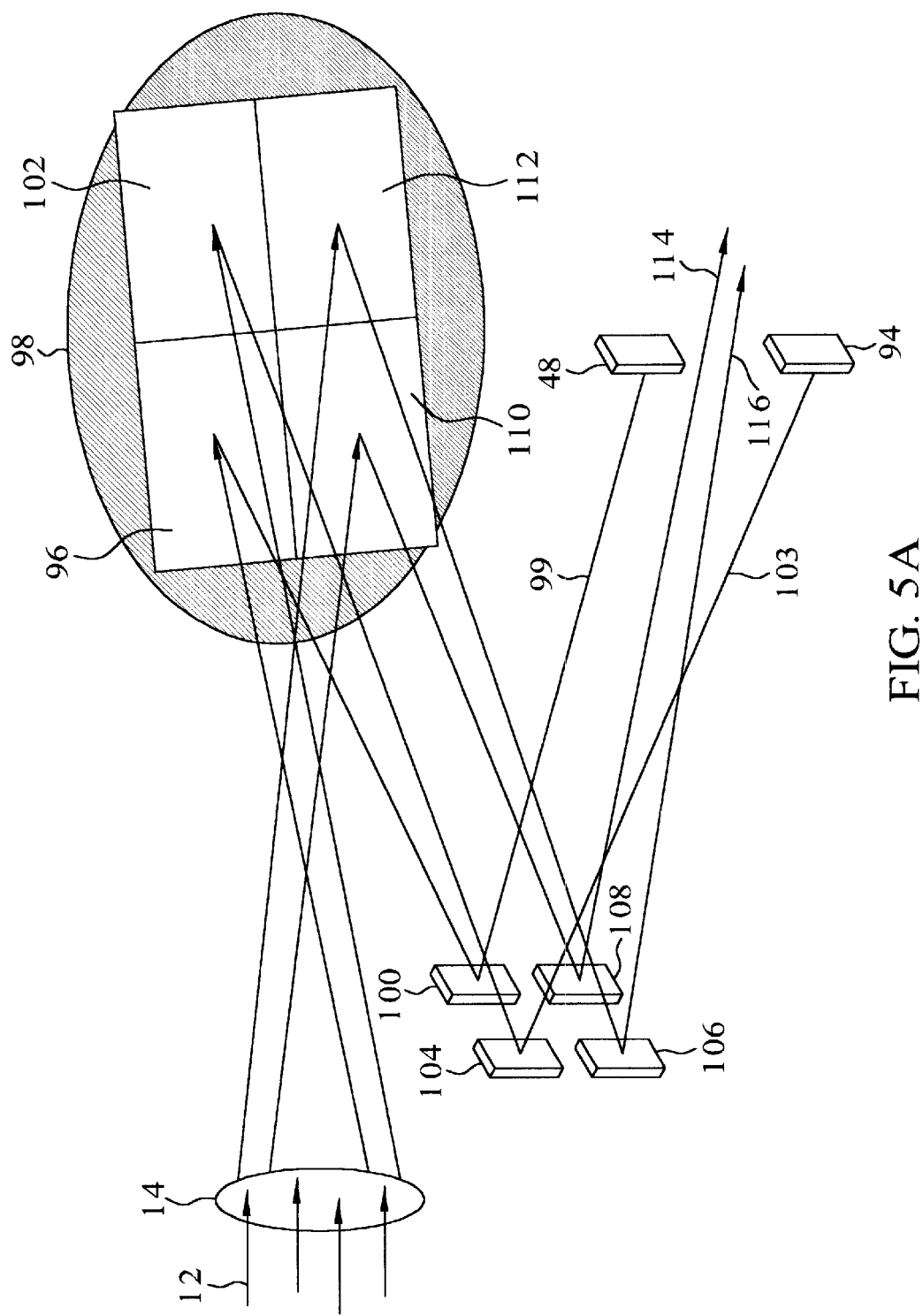
FIGS. 5A–5D illustrate selected operational details of the staring infrared imaging sensor of FIG. 1.

FIGS. 5A–5D illustrate the four different dispositions of these several elements over one complete integration cycle during operation of a dual-band detector of this invention. The illustrations shown in FIGS. 5A–5D are limited for simplicity of exposition to the principle rays in each optical path, with the various secondary and tertiary lenses omitted. During the first of four dispositions, as shown in FIG. 5A, the image sub-area 96 is reflected from the primary image plane 98 along the ray 99 onto first-band detector array 48 by the micro-mirror 100 when tilted "on" (+10 degrees). Simultaneously, the image sub-area 102 is reflected from primary image plane 98 along the ray 103 onto second-band detector array 94 by the micro-mirror 104 when tilted "off" (+10 degrees). During the first prescribed integration interval, all tilt bias is removed from the micro-mirrors 106 and 108 so they assume the "zero-bias" default position somewhere midway between the "on" and "off" tilt positions. When in the "zero-tilt" position, micro-mirrors 106 and 108 reflect the image sub-areas 110 and 112 along the rays 114 and 116 into the sensor housing region (not shown) somewhere between detector arrays 48 and 94 substantially as shown.

Figure 5B:
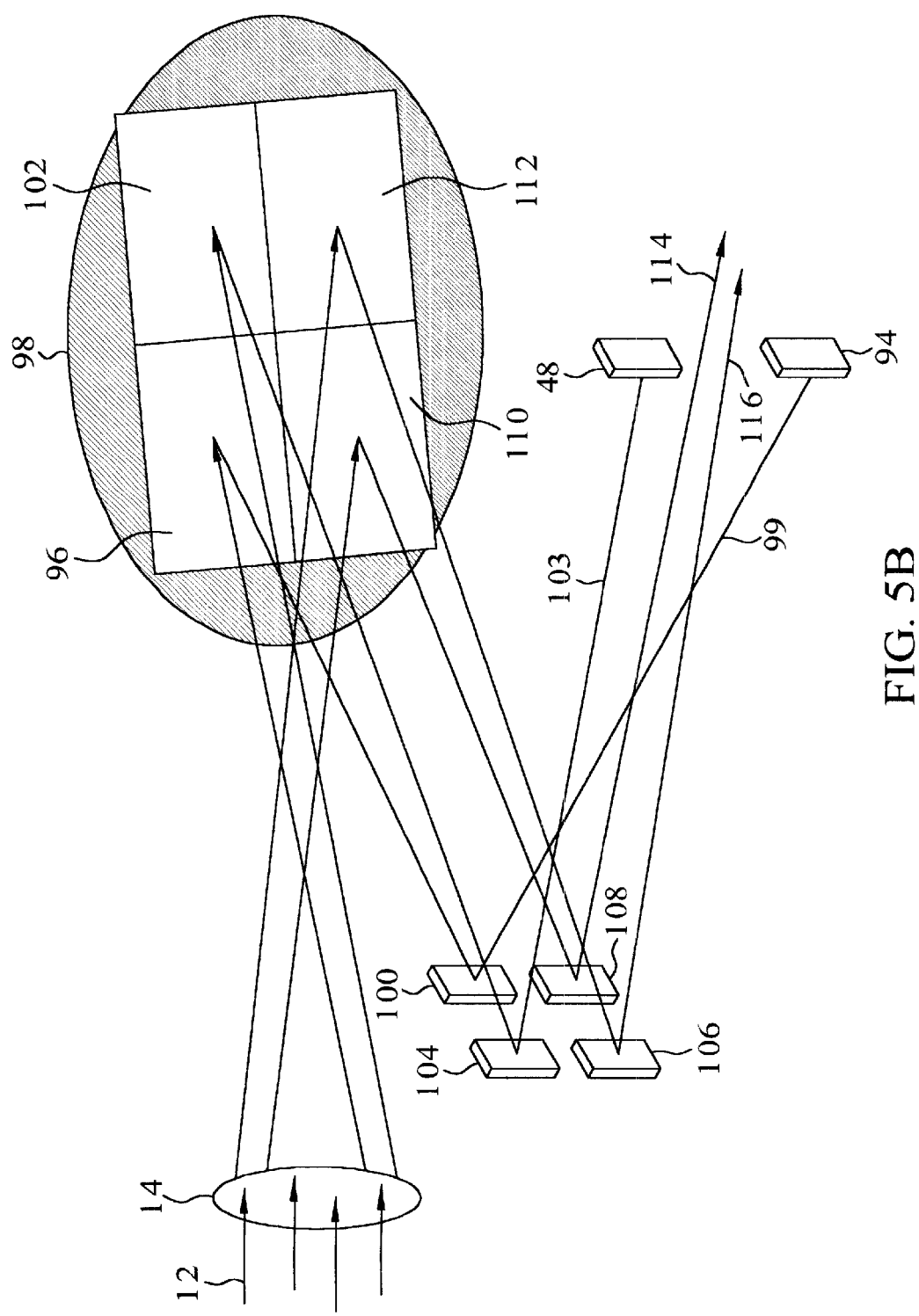

During the second of four dispositions, as shown in FIG. 5B, image sub-area 96 is reflected from primary image plane 98 along ray 99 onto second-band detector array 94 by micro-mirror 100 when tilted "off" (+10 degrees). Simultaneously, image sub-area 102 is reflected from primary image plane 98 along ray 103 onto first-band detector array 48 by micro-mirror 104 when tilted "on" (+10 degrees). During the second prescribed integration interval, all tilt bias is removed from micro-mirrors 106 and 108 as discussed above with reference to FIG. 5A.

Figure 5C:
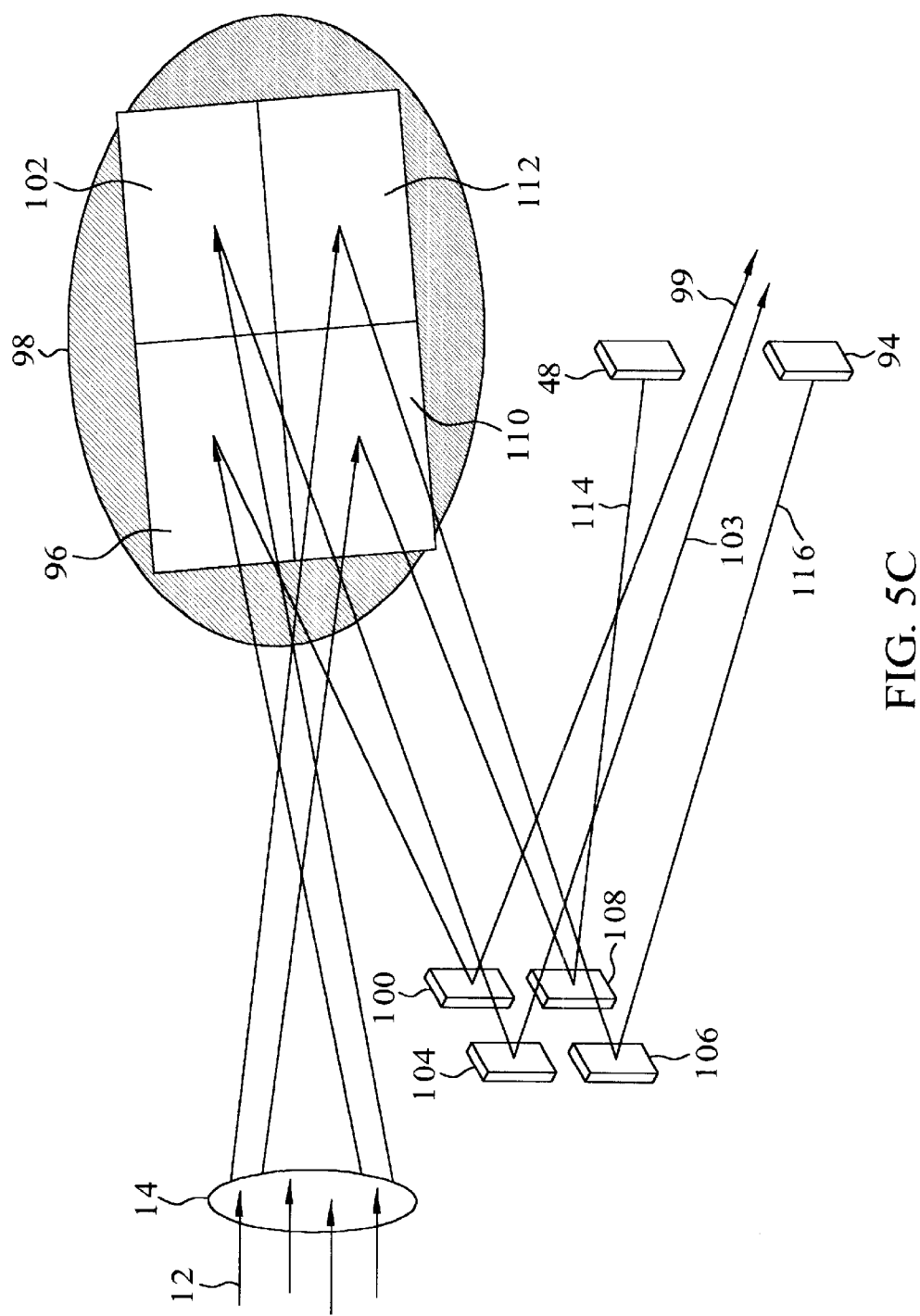

During the third of four dispositions, as shown in FIG. 5C, image sub-area 10 is reflected from primary image plane 98 along ray 114 onto first-band detector array 48 by micro-mirror 108 when tilted "on" (+10 degrees). Simultaneously, image sub-area 112 is reflected from primary image plane 98 along the ray 116 onto second-band detector array 94 by micro-mirror 106 when tilted "off" (−10 degrees). During the third prescribed integration interval, all tilt bias is removed from micro-mirrors 100 and 104 so they assume the "zero-bias" default position somewhere midway between the "on" and "off" tilt positions. When in the "zero-tilt" position, micro-mirrors 100 and 104 reflect the image sub-areas 96 and 102 along rays 99 and 103 into the sensor housing region (not shown) somewhere between detector arrays 48 and 94 substantially as shown.

Figure 5D:
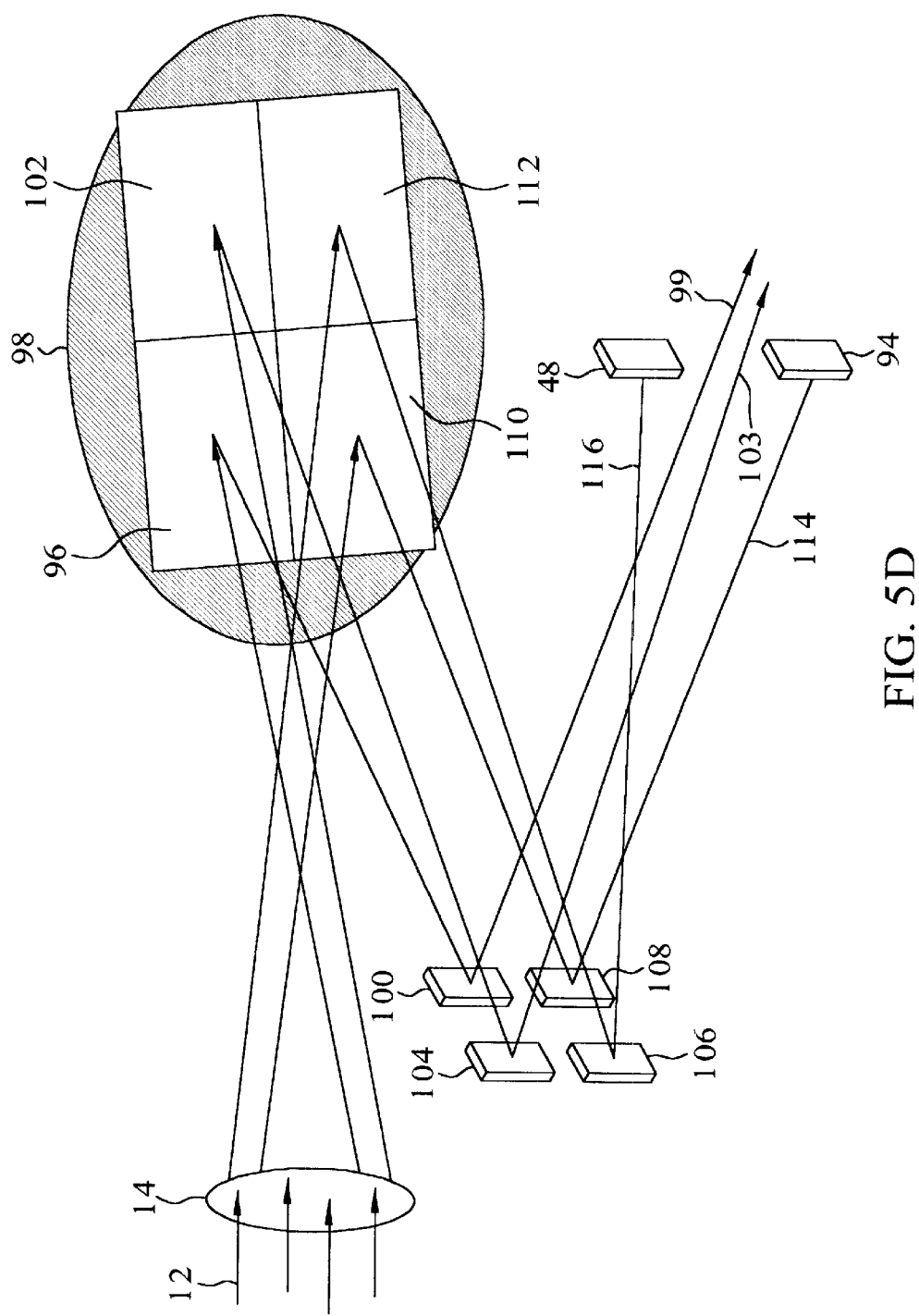

During the last of four dispositions, as shown in FIG. 5D, image sub-area 110 is reflected from primary image plane 98 along ray 114 onto second-band detector array 94 by micro-mirror 108 when tilted "off" (−10 degrees). Simultaneously, image sub-area 112 is reflected from primary image plane 98 along the ray 116 onto first-band detector array 48 by micro-mirror 106 when tilted "on" (+10 degrees). During the fourth prescribed integration interval, all tilt bias is removed from micro-mirrors 100 and 104 as discussed above with reference to FIG. 5C.

It may be readily appreciated by those familiar with the art that multi-spectral band imaging for more than two optical bands can be achieved by inserting additional micro-mirror arrays and re-imaging lens to form additional optical channels, based on these teachings. In such a configuration, each micro-mirror array is disposed to reflect its sub-area of the secondary image plane either onto a detector array or onto a successive micro-mirror array.

As discussed above with reference to FIG. 1, for normal IR imaging, only one image sub-area at a time need be reflected onto detector array 48 by a corresponding (active) secondary micro-mirror array. During the integration time, radiation from the respective TE cooler is imaged onto detector 48 by the other secondary micro-mirror array through the inactive optical channel. In FIG. 1, for example, upon arrival at sensor 48, the optical signal from active secondary mirror array 30 is added to the optical signal reflected by inactive secondary mirror array 36 from TE cooler 60. In normal operation, the temperature of TE cooler 60 is low enough so the inactive channel signal has negligible effect on the electrical output from sensor 48. However, the temperature of TE coolers 60 and 58 may be set as desired and individual micro-mirrors (pixels) of secondary mirror arrays 30 and 36 may be selected and controlled to reflect onto detector array 48, while adjacent micro-mirrors (pixels) in the same secondary mirror array are disposed to reflect radiation from TE cooler 60 or 58 onto detector array 48. In this manner, the temperature of the image sub-area reflected from the FOR can be estimated by comparing the signal level of the pixels representing the image sub-area with the pixels representing the TE cooler.

Although unsuitable for the specific type of micro-mirror array discussed above, a suitable micro-mirror array may be used with the apparatus of this invention to stabilize the image reflected onto the detector array. Such a suitable micro-mirror array must include micron-sized mirrors capable of continuous controlled angular disposition rather than the simple binary disposition (on and off) discussed above. In such an embodiment, the bias voltages that drive the micro-mirrors from one extreme position to the other must include a second analog signal voltage component responsive to an inertial navigation system, or similar attitude-sensing device, for incrementing the micro-mirror positions as necessary to offset the effects of platform motion. To correct for motion in two dimensions (e.g., for roll and pitch), two orthogonally-disposed micro-mirror arrays are required in each optical channel. In operation, the individual micro-mirrors (pixels) are disposed at a fixed angle modified by a position-sensor signal to offset the effects of platform motion.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

We claim:

1. A staring infrared imaging sensor comprising:
   a primary lens disposed to accept infrared radiation and to project therefrom a Field Of Regard (FOR) image onto a primary image plane;
   a plurality of primary mirrors disposed at the primary image plane each for reflecting a corresponding portion of the FOR image along a corresponding one of a plurality of optical paths;
   a secondary lens disposed within each optical path to focus the corresponding FOR image portion onto a corresponding secondary image plane within the corresponding optical path;
   a secondary mirror disposed at the corresponding secondary image plane within each optical path to reflect the corresponding FOR image portion along one of a corresponding plurality of preselected directions;
   an image detector disposed at a tertiary image plane for generating an electronic signal representing an image projected onto the tertiary image plane; and
   a tertiary lens disposed within each optical path to focus the corresponding FOR image portion onto the tertiary image plane.

2. The staring infrared imaging sensor of claim 1 further comprising:
   in each secondary mirror, a plurality of micro-mirrors each movable from one to another of a plurality of positions, whereby an instantaneous field of view (IFOV) image within the corresponding FOR image portion can be redirected from one to another of the preselected directions.

3. The staring infrared imaging sensor of claim 2 further comprising:
   a plurality of cold surfaces; and
   a plurality of fourth lenses, each disposed to project an image of a corresponding one of the cold surfaces onto a corresponding secondary image plane.

4. The staring infrared imaging sensor of claim 3 further comprising:
   a second image detector disposed at a fifth image plane for generating a second electronic signal representing an image projected onto the fifth image plane.

5. The staring infrared imaging sensor of claim 1 further comprising:
   a plurality of cold surfaces; and
   a plurality of fourth lenses, each disposed to project an image of a corresponding one of the cold surfaces onto a corresponding secondary image plane.

6. The staring infrared imaging sensor of claim 1 further comprising:
   a second image detector disposed at a fourth image plane for generating a second electronic signal representing an image projected onto the fourth image plane.

7. An infrared detection system comprising: a staring infrared imaging sensor including
   a primary lens disposed to accept infrared radiation and to project therefrom a Field Of Regard (FOR) image onto a primary image plane,
   a plurality of primary mirrors disposed at the primary image plane each for reflecting a corresponding portion of the FOR image along a corresponding one of a plurality of optical paths,
   a secondary lens disposed within each optical path to focus the corresponding FOR image portion onto a corresponding secondary image plane within the corresponding optical path,
   a secondary mirror disposed at the corresponding secondary image plane within each optical path to reflect the corresponding FOR image portion along one of a corresponding plurality of preselected directions,
   an image detector disposed at a tertiary image plane for generating an electronic signal representing an image projected onto the tertiary image plane, and
   a tertiary lens disposed within each optical path to focus the corresponding FOR image portion onto the tertiary image plane;
   a controller coupled to the secondary mirrors for apportioning the amount of time during which the corresponding FOR image portion is directed along any one of the corresponding plurality of preselected directions.

8. The infrared detection system of claim 7 further comprising:
   in each secondary mirror, a plurality of micro-mirrors each movable from one to another of a plurality of positions, whereby an instantaneous field of view (IFOV) image within the corresponding FOR image portion can be redirected from one to another of the preselected directions.

9. The infrared detection system of claim 8 further comprising:
   a plurality of cold surfaces; and
   a plurality of fourth lenses, each disposed to project an image of a corresponding one of the cold surfaces onto a corresponding secondary image plane.

10. The infrared detection system of claim 9 further comprising:
    a second image detector disposed at a fifth image plane for generating a second electronic signal representing an image projected onto the fifth image plane.

11. The infrared detection system of claim 7 further comprising:
    a plurality of cold surfaces; and
    a plurality of fourth lenses, each disposed to project an image of a corresponding one of the cold surfaces onto a corresponding secondary image plane.

12. The infrared detection system of claim 7 further comprising:
    a second image detector disposed at a fourth image plane for generating a second electronic signal representing an image projected onto the fourth image plane.

* * * * *